United States Patent
Stetson et al.

[19]

[11] Patent Number: 5,953,922
[45] Date of Patent: Sep. 21, 1999

[54] METAL HYDRIDE HYDROGEN STORAGE CONTAINER WITH VALVED PORTS

[76] Inventors: Ned T. Stetson, 2615 Greenstone Drive, Auburn Hills, Mich. 48326; Mark R. Nies, 550 E. Elmwood Apt. 301, Clawson, Mich. 48017

[21] Appl. No.: 09/008,929

[22] Filed: Jan. 20, 1998

[51] Int. Cl.[6] .................................................. F17C 11/00
[52] U.S. Cl. ...................................... 62/46.2; 165/104.12
[58] Field of Search ......................... 62/46.2; 165/104.12

[56] References Cited

U.S. PATENT DOCUMENTS

| | | | |
|---|---|---|---|
| 4,134,490 | 1/1979 | Turillon et al. | 62/46.2 |
| 4,134,491 | 1/1979 | Turillon et al. | 62/46.2 |
| 5,697,221 | 12/1997 | Sapru et al. | 62/46.2 |
| 5,778,972 | 7/1998 | Sapru et al. | 62/46.2 |

*Primary Examiner*—Ronald Capossela
*Attorney, Agent, or Firm*—Philip H. Schlazer; Marvin S. Siskind; David W. Schumaker

[57] ABSTRACT

A metal hydride hydrogen storage system comprising: at least a first metal hydride storage module directly coupled to an identical second metal hydride storage module, where each of the storage modules comprises: a metal hydride pressure vessel having a first and a second valved port; and a metal hydride material disposed within the pressure vessel; where the second valved port of the first module is directly coupled to the first valved port of said second module. The first and second valved ports of each of the storage modules may be adapted so that they are normally closed and so that said second valved port of the first module and the first valved port of the second module are urged open upon direct coupling.

14 Claims, 2 Drawing Sheets

METAL HYDRIDE HYDROGEN STORAGE CONTAINER WITH VALVED PORTS

FIELD OF THE INVENTION

The present invention is concerned with a hydrogen storage system. More particularly, the present invention is concerned with a metal hydride hydrogen storage system.

BACKGROUND

Hydrogen is stored conventionally as a gas or a liquid. Hydrogen storage as a gas is typically in large, bulky steel cylinders at very high pressures (e.g. 2,000 psi). Hydrogen storage as a liquid is typically in insulated containers at very low temperatures. Energy must be used to liquify the hydrogen. Hence, cryogenic hydrogen production and storage is highly inefficient.

Within recent years, considerable attention has been focused on the storage of hydrogen as a metallic compound, or hydride, of various substances. Metal hydrides can store large amounts of hydrogen at low pressures in relatively small volumes. This low pressure storage of hydrogen is relatively safe and allows the construction of hydrogen containers having forms significantly different than those storing gaseous hydrogen. Hydridable metals are charged with hydrogen by introducing pressurized gaseous hydrogen into valved containers. The hydrogen gas reacts exothermically with the metal to form the metal hydride compound. Conversely, the hydrogen is released from the metal hydride by opening the valve of the container to permit decomposition of the compound in an endothermic reaction.

The use of solid hydridable materials to store hydrogen is disclosed in numerous patents, such as U.S. Pat. Nos. 3,508,514, 3,516,263 and 4,036,944, each incorporated herein by reference. These solid hydridable materials are characterized by an interrelation of temperature, pressure and hydrogen content, such that, at any given temperature, the hydrogen content of the hydridable material is determined by the partial pressure of the hydrogen in contact with that material. Generally, as temperature rises it takes a greater partial pressure of hydrogen to maintain a given concentration of hydrogen in the hydridable material. The converse is also true as temperature decreases.

The reversible storage of hydrogen in the form of an intermetallic hydride has several advantages over conventional gaseous and liquid hydrogen storage. The use of metal hydrides offer pronounced volumetric advantages over compressed gas, along with much lower required pressure, a safety advantage. In addition, the use of metal hydrides provides excellent insurance that the hydrogen released from the containers is of very high purity.

Metal hydride storage units have many uses and applications in a variety of industrial and laboratory environments. The diversity of applications requires a storage system that can provide the end-user with a reliable source of hydrogen at a variety of capacities. A modular metal hydride hydrogen storage system is needed that can be easily and safely modified by an end-user to provide reliable hydrogen storage for a variety of applications.

U.S. Pat. No. 4,489,564 to Haussler is directed toward a metal hydride storage device for hydrogen but fails to show how several modules may be directly coupled to provide a modular metal hydride hydrogen storage system. U.S. Pat. No. 1,835,887 to Mackey describes a series of interconnected gas expansion chambers that increase in size from inlet to outlet. Mackey, however, contains no teaching or suggestion of metal hydride hydrogen storage modules.

Commonly assigned U.S. Pat. No. 5,697,221 as well as commonly assigned U.S. patent application No. 08/623,497 disclose modular metal hydride storage systems. The disclosures of U.S. Pat. No. 5,697,221 and U.S. patent application No. 08/623,497 are herein incorporated by reference. The present patent application describes a modular metal hydride storage system that includes a system of valved ports that provide the end-user with a very simple and reliable means of coupling and decoupling individual storage modules to create a hydrogen storage system of desired capacity.

SUMMARY OF THE INVENTION

One objective of the present invention is to provide a modular metal hydride hydrogen storage system which can provide a robust and reliable source of hydrogen that can be quickly and easily modified for a variety of applications and environments.

This and other objectives are satisfied by a metal hydride hydrogen storage system comprising: at least a first metal hydride storage module directly coupled to an identical second metal hydride storage module, where each of the storage modules comprises: a metal hydride pressure vessel having a first and a second valved port; and a metal hydride material disposed within the pressure vessel; where the second valved port of the first module is directly coupled to the first valved port of the second module.

The first and second valved ports of each of the storage modules may be adapted so that they are normally closed and so that said second valved port of the first module and the first valved port of the second module are urged open upon direct coupling.

DETAILED DESCRIPTION OF THE INVENTION

The present invention discloses a uniquely designed metal hydride storage module that can be directly coupled end-to-end with identical storage modules to form a robust, reliable and well-engineered metal hydride hydrogen storage system.

Figure 1:
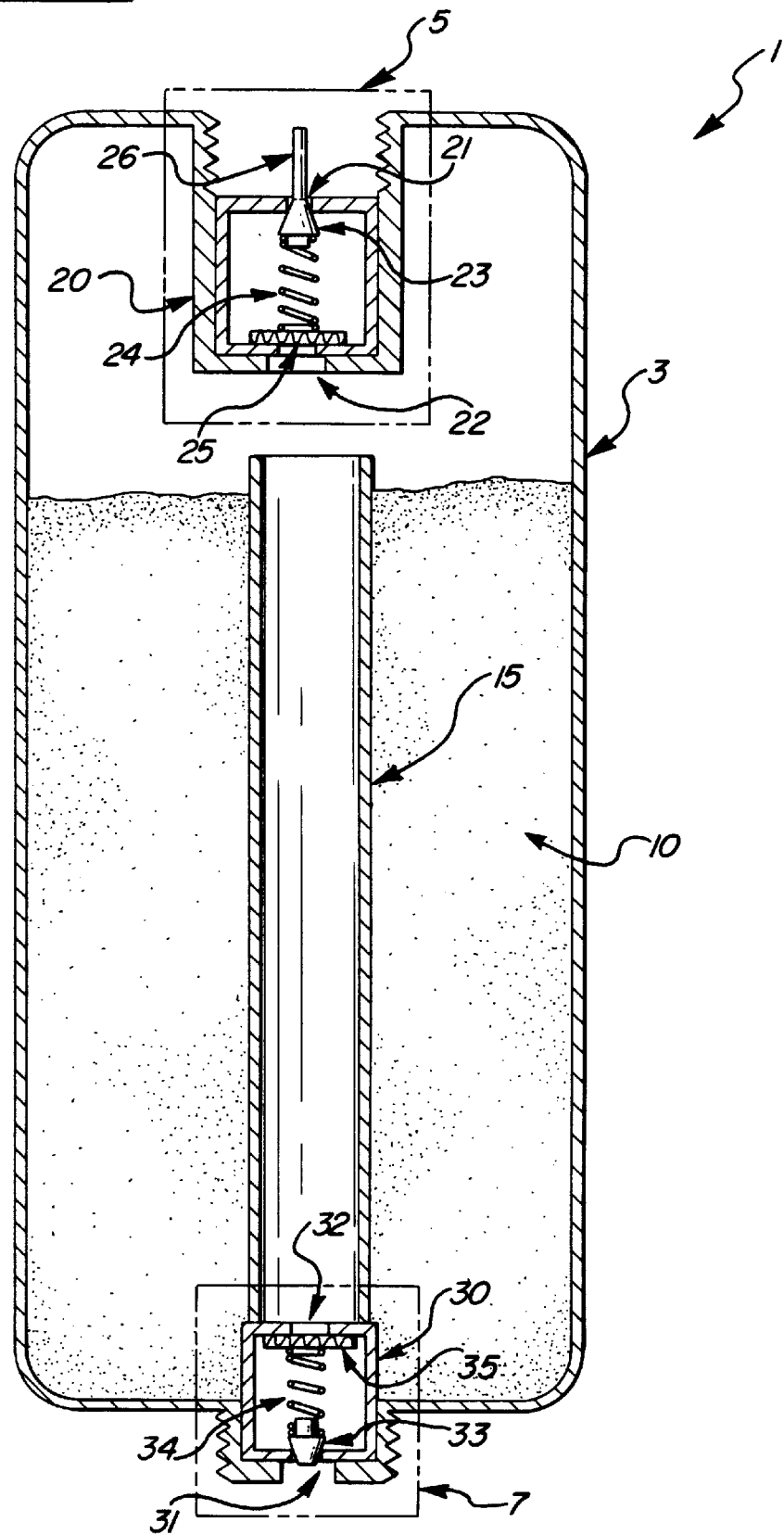
FIG. 1 depicts a single metal hydride hydrogen storage module.

FIG. 1 shows an embodiment of the metal hydride hydrogen storage module 1 of the present invention. The module comprises a metal hydride pressure vessel 3 having a first valved port 5 and a second valved port 7.

The metal hydride pressure vessel 3 is preferably made from a metallic thermally conductive material so that heat may be efficiently transferred between the interior and the exterior of the vessel. Heat is transferred away from the metal hydride during the hydrogen absorption process (exothermic) and transferred into the metal hydride during the hydrogen desorption process (endothermic). To further improve the transfer of heat, the pressure vessel 3 may include a plurality of heat fins (not shown) spaced around the vessel's exterior. Other methods of heat exchange may also be used.

The metal hydride module 1 further includes a solid metal hydride material 10 placed in the interior of the pressure vessel. The solid metal hydride 10 material may either partially or totally fill the interior of the pressure vessel 3.

The metal hydride material 10 may be formed from a number of metals, alloys and intermetallic compounds which react reversibly with hydrogen at ambient temperature and modest gas pressure. Examples of compounds that may be used to form metal hydrides include, but are not limited to, the alloys from the $AB_5$, (e.g. $LaNi_5$), AB (e.g. TiFe), $A_2B$ (e.g. $Mg_2Ni$), and $AB_2$ (e.g., $ZrV_2$ and $ZrMn_2$) families. Using these compounds, metal hydrides can be formed readily and reversibly (i.e. hydrogenated and dehydrogenated) in the vicinity of ordinary temperatures and at modest hydrogen pressures. That portion of the interior of pressure vessel 3 not filled with metal hydride material is the gaseous hydrogen region.

In one embodiment of the present invention, the metal hydride material may be physically bonded to a support structure. The support structure may take the form of any structure that can hold the metal hydride material. Examples of support structures include, but are not limited to, mesh, grid, foil, foam and plate. The material chosen should have the appropriate thermodynamic characteristics that can provide the necessary heat transfer between the metal hydride material and the external environment. The support structure is discussed in more detail in commonly assigned U.S. patent application No. 08/623,497, the disclosure of which is herein incorporated by reference.

The metal hydride module 1 may further comprise passage means for distributing the hydrogen gas that enters the pressure vessel via the second valved port. The passage means is located within the pressure vessel 3 and is placed in gaseous communication with the second valved port 7. As stated, the passage means efficiently distributes the hydrogen gas into the metal hydride material. One embodiment of the distribution means is a passage tube 15 positioned along the axis of the pressure vessel 3. The passage tube 15 is preferably made of a material that is permeable to the hydrogen gas. This is done so that the hydrogen gas can pass through the wall of the passage tube as hydrogen is absorbed and desorbed by the metal hydride material. The passage tube 15 is impermeable to the metal hydride material so that the solid material cannot enter the interior of the passage tube. As discussed, the passage tube is gaseously connected to the second valved port 7. The other end of the passage tube may be gaseously connected to the first valved port 5, or it may open into the interior of the pressure vessel 3. When the passage tube 15 opens into the interior of the pressure vessel 3, the opening is preferably covered with a particle filter that prevents the metal hydride material from entering the interior of the passage tube.

Generally, the first and second valved ports 5, 7 are adapted so that the second valved port of a storage module can be directly coupled to the first valved port of another identical storage module, and so that the second valved port of a storage module can be directly coupled to the first valved port of another storage module. As defined herein "directly coupled" means that the attachment mechanism that provides for attachment of one storage module to another is integrated into the first and second valved ports. Hence, attachment may be made without the need of extraneous tubes, fittings, clamps, etc. In the embodiment of the storage module shown in FIG. 1, the first and second valved ports 5, 7 of each of the storage modules are threaded so that the second valved port of one storage module can be screwed into the first valved port of a second, identical storage module. Alternate means of direct coupling are also possible. For example, the first and second valved ports 5, 7 may be adapted so that the second valved port of one storage module can be friction fit into the first valved port of a second, identical storage module. As well, the first and second valved ports 5,7 may be designed for quick connect/disconnect coupling.

The first and second valved ports may be either in an "open" or a "closed" position. An open position permits gaseous communication between the interior and exterior of the storage module while a closed position prevents such gaseous communication.

In general, any type of valve system that can control the flow of the hydrogen gas may be used for the first and second valved port. For example, the valve system may be designed so that the first and second valved ports can be manually placed into the open and closed position. Any type of manually operated valve known in the art that can control the flow of the hydrogen gas can be used for this purpose. Examples include, but are not limited to, ball valves and gates valves.

Preferably, the first and second valved ports are adapted to meet the following "valve conditions": (1) the first and second valved ports of an individual storage module are normally in closed position so that gas cannot enter or leave the storage module; and (2) the second valved port of a first storage module and the first valved port of a second identical storage module are urged into open position when the second valved port of the first storage module and the first valved port of the second storage module are directly coupled together.

Various types of valved ports may be used that will open and close as dictated by the "valve conditions" described above. In one embodiment of the present invention, the first and second valved ports of each of the storage modules are designed so that, upon direct coupling, the second valved port of the first storage module urges the first valved port of the second storage module into open position, and the first valved port of the second storage module urges the second valved port of the first storage module into open position.

One embodiment of the first and second valved ports is shown in FIG. 1. As shown in FIG. 1, the first valved port 5 comprises a first valve housing 20 having a hollow interior area, an exterior opening 21 permitting gaseous communication with the exterior of the pressure vessel 3 and a interior opening 22 permitting gaseous communication with the interior of the pressure vessel 3. The first valved port further comprises a first valve piston 23 sized to seal the exterior opening 21, and a first compression spring 24 positioned to urge the first valve piston 23 against the exterior opening 21 so that the first valve piston 23 will normally block the first opening 21. In the embodiment shown in FIG. 1, the first valve piston 23 includes a piston extension 26 that extends from the tip thereof. The piston extension is sized to extend through the exterior opening 21 when the valved piston is urged against the exterior opening. The first valved port 5 may further comprise a first valve filter 25 that is sized and positioned to block the interior opening 22 of each of the valved ports. The first valve filter 25 filters impurities from the hydrogen gas passing through the first valved port 5.

The second valved port 7 is similar to the first valved port 5. The second valved port 7 comprises a second valve housing 30 having a hollow interior area, an exterior opening 31 permitting gaseous communication with the exterior of the pressure vessel 3 and an interior opening 32 permitting gaseous communication with the interior of the pressure vessel 3. The second valved port 7 further comprises a second valve piston 33 sized to seal the exterior opening 31, and a second compression spring 34 positioned to urge the second valve piston 33 against the exterior opening 31 so that the second valve piston 33 will normally block the exterior opening 31, thereby preventing the flow of gas through either of the valved ports. The second valved port may further comprise a second valve filter 35 that is sized and positioned to block the exterior opening 32 of each of the second valved port. The second valve filter 35 filters impurities from the hydrogen gas passing though the second valved port 7.

Figure 2:
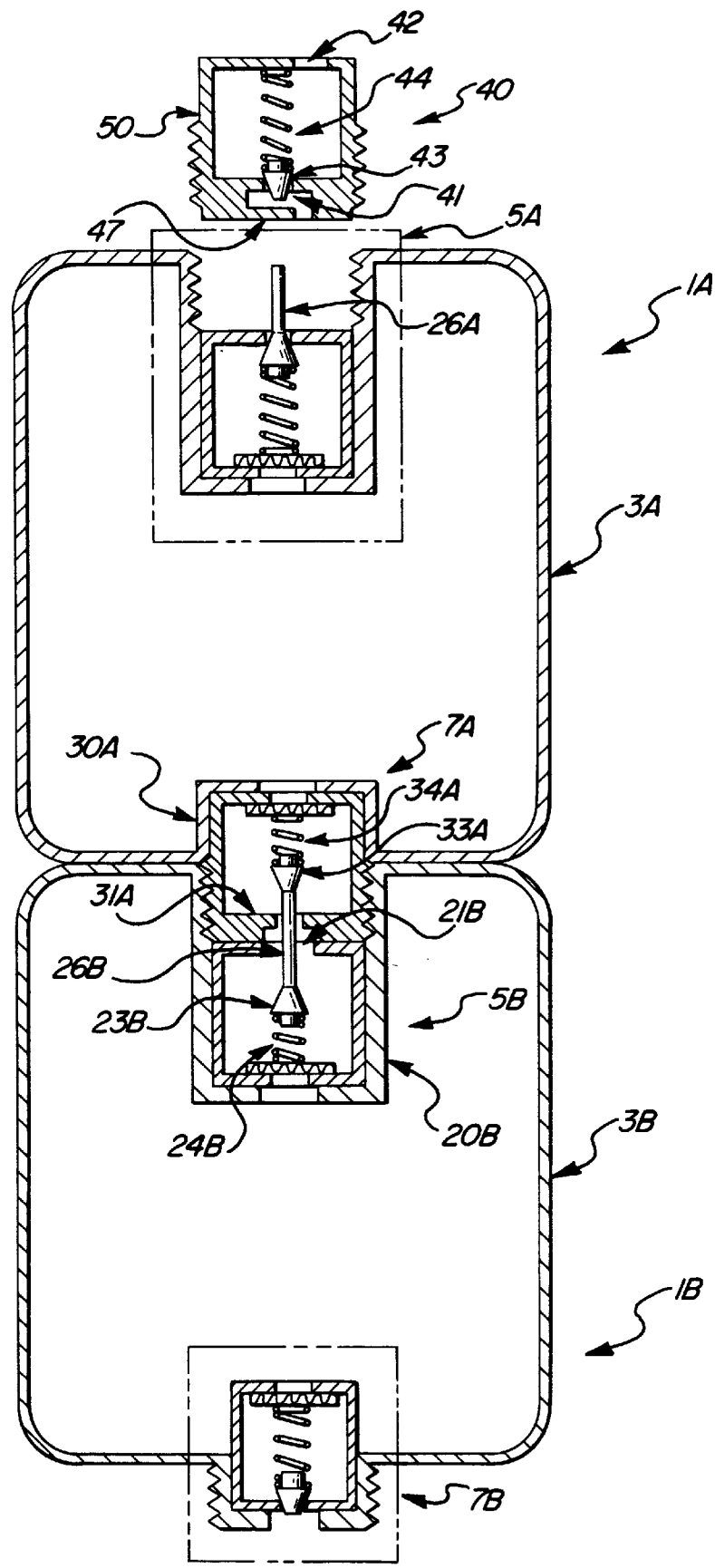
FIG. 2 depicts a first metal hydride storage module directly coupled to a second metal hydride storage module.

FIG. 2 shows a first storage module 1A and an identical second storage module 1B. It is noted that both storage modules are identical to that shown in FIG. 1.

In FIG. 2, first storage module 1A has been directly coupled to second storage module 1B. In particular, the second valved port 7A of the first storage module 1A is directly coupled to the first valved port 5B of the second storage module 1B. In the embodiment shown, direct coupling is accomplished by screwing the second valved port 7A into the first valved port 5B. FIG. 2 shows the metal hydride pressure vessels 3A, 3B of the first and second storage modules 1A, 1B respectively. FIG. 2 does not show either the metal hydride material or the passage tubes.

The first and second valved ports of both the first and the second storage module 1A, 1B satisfy the "valve conditions" discussed above. Specifically, the first and second valves of each of the storage modules 1A, 1B are normally in the closed position. The second valved port 7A of the first storage module 1A and the first valved port 5B of the second storage module 1B are open when the two valved ports are directly coupled together.

In the embodiment of the invention shown in FIG. 2, the valved ports are adapted so that, upon direct coupling of the two storage modules, the first valve piston of the second storage module urges open the second valved port of the first storage module, and the second valve piston of the first storage module urges open the first valved port of the second storage module. More specifically, in the embodiment shown in FIG. 2, the extension tip 26B of the first valve piston 23B of the second storage module 1B and the second valve piston 33A of the first storage module 1A make contact. The contact between the two valve pistons 33A and 23B compresses the compression springs 34A and 24B and urges both valve pistons away from their respective exterior openings, thereby urging both of the valved ports into open position and permitting gaseous communication between the two storage modules. The extension tip 26B of valve piston 23B is sized and positioned to extrude through the exterior opening 21B of the first valved port 5B as well as through the exterior opening 31A of the second valved port 7A when the first and second storage modules 1A, 1B are coupled together.

It is noted that second valved port 7A and first valved port 5B are opened only after the two storage modules 1A and 1B have been sufficiently coupled together so that the region between the two valves is gaseously sealed from the external atmosphere. Hence, hydrogen gas cannot escape into the atmosphere when the two storage modules are directly coupled. As well, when the two storage modules are taken apart, the second valved port 7A and the first valved port 5B are closed before the two storage modules are completely separated. This minimizes the loss of hydrogen into the external atmosphere.

In another embodiment of the present invention the first and second valved ports of each of the storage modules are adapted so that the first valve housing of the second storage module urges open the second valved port of the first storage module upon direct coupling, and the second valve housing of the first storage module urges open the first valved port of the second storage module upon direct coupling. This may be accomplished by permitting the second valve housing 30A of the first storage module 3A to make contact with the valve piston 23B of the first valved port 5B upon direct coupling, thereby urging the first valved port 5B into open position; and by permitting the first valve housing 20B of the second storage module 3B to make contact with valve piston 33A upon direct coupling, thereby urging the second valved port 7A into open position.

Connecting the two identical storage modules together as shown in FIG. 2 doubles the hydrogen storage capacity from that of a single module. The hydrogen storage capacity may be increased further by adding additional modules. For example, an identical third storage module may be directly coupled to the second valved port 7B of the second storage module 1B, and so on. The hydrogen storage capacity of the system may be decreased by simply disconnecting one or more of the metal hydride hydrogen storage modules. As discussed, because of the specially designed first and second valved ports, each of the individual modules remains tightly sealed and closed to gaseous communication until it is directly coupled to another module. Hence, the individual storage modules may be added to and removed from the storage system by an end user with minimal loss of hydrogen gas into the surrounding atmosphere.

The hydrogen storage system of the present invention may further comprise a pressure relief valve for relieving excess gas pressure. Generally, the pressure relief valve is designed to remain closed until the gas pressure within the hydrogen storage system is above a predetermined critical value, at which point the gas relief valve is urged open to release the gas pressure.

The pressure relief valve may be adapted to be directly coupled to the first valved port of a storage module. Further, the pressure relief valve may be adapted so that the first valve port is urged in open position upon direct coupling with the pressure relief valve.

An embodiment of the pressure relief valve is shown in FIG. 2. As shown in FIG. 2, the pressure relief valve comprises a third valve housing 50 having a hollow interior area, a first opening 41 and a second opening 42. The pressure relief valve 40 further comprises a third valve piston 43 sized to seal the first opening 41, and a third compression spring 44 positioned to urge the third valve piston 43 against the first opening 41 so that the third valve piston will normally block the first opening 41. While not necessary, a particle filter (not shown) may be used to cover the second opening 42 as an additional means of preventing impurities from entering the hydrogen storage system through the pressure relief valve.

In FIG. 2, the pressure relief valve 40 may be directly coupled to the hydrogen storage system comprising the first and second storage module 1A, 1B. Furthermore, in the embodiment shown, the pressure relief valve 40 is adapted to urge the first valved port 5A in open position upon direct coupling.

Specifically, in the embodiment shown in FIG. 2, direct coupling is accomplished by screwing the pressure relief valve 40 into the first valved port 5A of the first storage module 3A. Direct coupling may be accomplished by other means. Examples include, but are not limited to, a friction fit mechanism and a quick connect/disconnect mechanism. The pressure relief valve 40 includes a flap 47 that extends in front of the first opening 41. The flap 47 is adapted to contact the extension tip 26A of the first valved port 5A when the pressure relief valve is directly coupled to the first storage module 5A. The flap 47 urges the first valved port 5A into open position. It is noted that pressure relief valve 40 is one embodiment of a pressure relief valve that may be used with the hydrogen storage modules of the present invention. Other pressure relief valves known in the art may be adapted for use with the hydrogen storage modules.

FIG. 2 shows a pressure relief valve 40 positioned to be directly coupled to a metal hydride hydrogen storage system comprising two identical storage modules. The pressure relief valve may be directly coupled to a hydrogen storage system comprising a single hydrogen storage module. As well the pressure relief valve may be directly coupled to a hydrogen storage system comprising more than two identical, directly coupled hydrogen storage modules.

In general, the modularity of the system greatly simplifies the engineering effort necessary to design storage units of different capacities. An understanding of the engineering characteristics of a single storage module provides an understanding of the characteristics of larger capacity storage systems built by connecting several storage modules together. For example, the design of a metal hydride hydrogen storage system requires a good understanding of the heat transfer properties of the system. As mentioned earlier, heat flows out of and into the metal hydride material as hydrogen is absorbed by the metal and released by the metal. Proper operation of the storage system requires that the underlying design includes the proper heat transfer means that can appropriately transfer heat out of and into the metal hydride.

The design of the appropriate heat transfer mechanism depends upon many factors. These include the type and quantity of metal hydride used as well as the shape, volume and material of the container holding the metal hydride. Changing the volume of the container in order to increase hydrogen storage capacity changes the heat transfer characteristics of the storage system and requires a modification of the heat exchange system. This increases the complexity and cost of the design process.

Because the capacity of the hydrogen storage system of the present invention is increased or decreased by adding or removing identical storage modules, the heat transfer characteristics of almost any capacity system can be understood in terms of the heat transfer characteristics of a single storage module. Hence, once a heat exchange system has been appropriately designed for a single module it is not necessary to re-design the system for larger systems. It is thus possible to provide a hydrogen storage system of almost any capacity which is well engineered, highly reliable and of superior quality.

Finally, the metal hydride storage system of the present invention provides a way to increase hydrogen capacity quickly and easily without the need for adding valves and tubing that add cost and quality problems to the system. Valves and tubing can crack and leak from embrittlement, fatigue and external vibration, thus decreasing the reliability of the storage system. This factor is again especially important for applications in automotive manufacturing where the need to package and route extraneous fuel lines can easily be a major source of design, manufacturing and quality problems.

While the invention has been described in connection with preferred embodiments and procedures, it is to be understood that it is not intended to limit the invention to the described embodiments and procedures. On the contrary it is intended to cover all alternatives, modifications and equivalence which may be included within the spirit and scope of the invention as defined by the claims appended hereinafter.

We claim:

1. A metal hydride hydrogen storage system comprising:
   at least a first metal hydride storage module directly coupled to an identical second metal hydride storage module, where each of said storage modules comprises:
      a metal hydride pressure vessel having a first and a second valved port; and
      a metal hydride material disposed within said pressure vessel;
   where said second valved port of said first module is directly coupled to said first valved port of said second module.

2. The storage system of claim 1, wherein said first and second valved ports of each of said storage modules are normally closed and adapted so that said second valved port of said first module and said first valved port of said second module are urged open upon direct coupling.

3. The storage system of claim 2, wherein said second valved port of said first storage module is urged open by said first valved port of said second storage module, and said first valved port of said second storage module is urged open by said second valved port of said first storage module.

4. The storage system of claim 1, wherein each of said storage modules further comprises passage means, housed within said pressure vessel and gaseously connected to said second valved port, for distributing hydrogen gas into said metal hydride material.

5. The storage system of claim 4, wherein said passage means is a passage tube.

6. The storage system of claim 1, further comprising a pressure relief valve directly coupled to said first valved port of said first module.

7. The storage system of claim 6, wherein said pressure relief valve is adapted to urge open said first valved port upon directly coupling.

8. The storage system of claim 2, wherein said first valved port of each of said storage modules comprises:
   a first valve housing having a hollow interior area, an exterior opening permitting gaseous communication with the exterior of said pressure vessel, and an interior opening permitting gasous communication with the interior of said pressure vessel;
   a first valve piston sized to seal said exterior opening of said first valve housing; and
   a first compression spring positioned to urge said first valve piston against said exterior opening of said first valve housing and block said exterior opening of said first valve housing; and further wherein, said second valved port of each of said storage modules comprises:
   a second valve housing having a hollow interior area, an exterior opening permitting gaseous communication with the exterior of said pressure vessel and an interior opening permitting gasous communication with the interior of said pressure vessel;
   a second valve piston sized to seal said exterior opening of said second valve housing; and
   a second compression spring positioned to urge said second valve piston against said exterior opening of said second valve housing and block said exterior opening of said second valve housing.

9. The storage system of claim 8, wherein said first valved port further comprises a first particle filter positioned and sized to block said interior opening of said first valved port, and said second valved port further comprises a second particle filter positioned and sized to block said interior opening of said second valved port.

10. The storage system of claim 8, wherein said first valved port and said second valved port of each of said storage modules are adapted so that said first valve piston of said second storage module urges open said second valved port of said first storage module upon direct coupling, and said second valve piston of said first storage module urges open said first valved port of said second storage module upon direct coupling.

11. The storage system of claim 8, wherein said first valved port and said second valved port of each of said storage modules are adapted so that said first valve housing of said second storage module urges open said second valved port of said first storage module upon direct coupling, and said second valve housing of said first storage module urges open said first valved port of said second storage module upon direct coupling.

12. The storage system of claim 6, wherein said pressure relief valve comprises:

a third valve housing having a hollow interior area, a first opening providing gaseous communication with said first module and a second opening providing gaseous communication with said surrounding atmosphere;

a third valve piston sized to seal said interior opening of said third valve housing;

a third compression spring positioned to urge said valve piston against said interior opening of said third valve housing to block said interior opening of said third valve housing.

13. The storage system of claim 1, wherein said metal hydride material is physically bonded to a support means.

14. The storage system of claim 13, wherein said support means is selected from the group consisting of mesh, grid, matte, foil, foam and plate.

* * * * *